United States Patent
Taylor et al.

(10) Patent No.: US 8,755,986 B2
(45) Date of Patent: Jun. 17, 2014

(54) VEHICLE ACCELERATION WHEN IN AN AIR RESTRICTION MODE

(75) Inventors: Michael V. Taylor, Wolverine Lake, MI (US); Thomas Larose, Jr., Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 878 days.

(21) Appl. No.: 12/878,365

(22) Filed: Sep. 9, 2010

(65) Prior Publication Data

US 2012/0065866 A1 Mar. 15, 2012

(51) Int. Cl.
| | |
|---|---|
| *G06F 19/00* | (2011.01) |
| *F02D 11/10* | (2006.01) |
| *F02M 25/07* | (2006.01) |
| *F02D 41/02* | (2006.01) |
| *F02D 41/10* | (2006.01) |
| *F02D 41/00* | (2006.01) |

(52) U.S. Cl.
CPC ........ *F02D 41/029* (2013.01); *F02D 2200/501* (2013.01); *F02D 2200/602* (2013.01); *F02D 2041/0022* (2013.01); *Y02T 10/42* (2013.01); *F02D 41/0002* (2013.01); *F02D 41/0245* (2013.01); *F02D 41/10* (2013.01); *Y02T 10/26* (2013.01); *F02D 11/105* (2013.01); *F02D 2041/0017* (2013.01)
USPC ........... 701/103; 701/108; 701/110; 123/399; 123/568.21

(58) Field of Classification Search
USPC ................ 701/102, 103, 108, 110, 114, 115; 123/361, 396, 568.21, 676; 60/284, 60/285
See application file for complete search history.

(56) References Cited

U.S. PATENT DOCUMENTS

| | | | |
|---|---|---|---|
| 5,255,653 A | 10/1993 | Ironside et al. | |
| 5,323,748 A * | 6/1994 | Foster et al. | 123/568.26 |
| 5,405,301 A | 4/1995 | Yagi et al. | |
| 6,027,425 A * | 2/2000 | Sakaguchi et al. | 701/58 |
| 6,157,885 A * | 12/2000 | Sakaguchi et al. | 701/54 |
| 6,295,967 B1 | 10/2001 | Weber et al. | |
| 7,426,828 B2 * | 9/2008 | Carbonne et al. | 123/399 |
| 2005/0065691 A1 | 3/2005 | Cho | |
| 2008/0097677 A1 | 4/2008 | Kawakami | |

* cited by examiner

*Primary Examiner* — Stephen K Cronin
*Assistant Examiner* — Anthony L Bacon
(74) *Attorney, Agent, or Firm* — Quinn Law Group, PLLC

(57) ABSTRACT

A method of controlling an engine of a vehicle having a particulate filter and operable in an air restriction mode wherein air inflow to an air intake throttle is restricted includes determining if the engine is operating in the air restriction mode, sensing a position of an accelerator pedal, and sensing a speed of the vehicle. The method further includes removing the restriction to the air intake throttle when the engine is operating in the air restriction mode, one of a change in position of the accelerator pedal over a period of time is greater than a pre-defined pedal acceleration rate or the position of the accelerator pedal is equal to a pre-defined pedal limit, and the speed of the vehicle is less than a pre-defined speed limit.

20 Claims, 1 Drawing Sheet

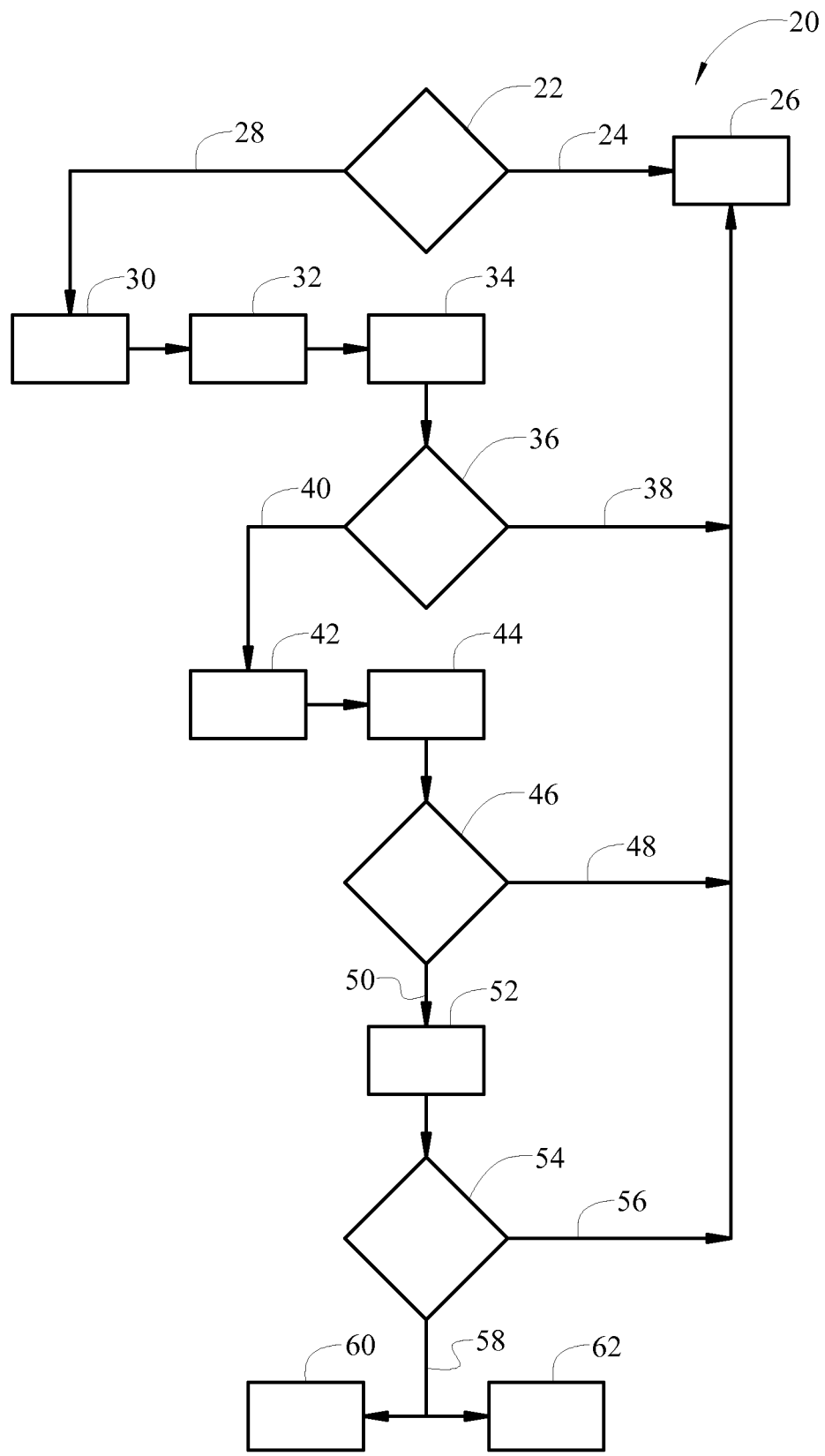

VEHICLE ACCELERATION WHEN IN AN AIR RESTRICTION MODE

TECHNICAL FIELD

The invention generally relates to a method of controlling an internal combustion engine of a vehicle, wherein the engine is operable in an air restriction mode.

BACKGROUND

Vehicles powered by internal combustion engines may be operated in an air restriction mode to increase the temperature of a exhaust gas from the engine. For example, the vehicle may include a particulate filter for filtering particulate matter from the exhaust gas. When the engine is a diesel engine, the particulate filter is commonly referred to as a diesel particulate filter. The particulate filter collects the particulate matter. Periodically, the particulate filter must be regenerated. Regeneration of the particulate filter includes heating the particulate filter to a temperature sufficient to burn the particulate matter collected in the particulate filter, which converts the particulate matter to carbon dioxide. In order to regenerate the particulate filter, the engine may operate in the air restriction mode, commonly referred to as a regeneration mode, wherein the engine is controlled to increase the temperature of the exhaust gas to heat the particulate filter. For example, the engine may be controlled to restrict the flow of intake air into the combustion chamber of the engine, thereby increasing the temperature of the exhaust gas.

The vehicle may also include an oxidation catalyst for oxidizing unburned hydrocarbons in the exhaust of the engine. The oxidation catalyst must be heated to a light-off temperature in order to oxidize the unburned hydrocarbons. Accordingly, the engine may also operate in the air restriction mode to increase the temperature of the exhaust gas to heat the oxidation catalyst.

The acceleration of the vehicle is hindered when the engine is operating in the air restriction mode, i.e., when the flow of intake air is restricted to increase the temperature of the exhaust gas. Accordingly, when the engine is operating in the air restriction mode, the acceleration of the vehicle is less responsive then when the engine is not operating in the air restriction mode.

SUMMARY

A method of controlling an internal combustion engine of a vehicle having a particulate filter is provided. The method includes continuously sensing a position of an accelerator pedal of the vehicle, sensing a speed of the vehicle, and removing a restriction to the air intake throttle to allow unrestricted intake airflow to the engine. The restriction to the air intake throttle is removed when the engine is operating in an air restriction mode, when one of a change in position of the accelerator pedal over a period of time is greater than a pre-defined pedal acceleration limit or the position of the accelerator pedal is equal to a pre-defined pedal limit, and when the speed of the vehicle is less than a pre-defined speed limit.

A method of controlling an internal combustion engine of a vehicle is also provided. The method includes continuously sensing a position of an accelerator pedal of the vehicle, and sensing a speed of the vehicle. The method further includes removing a restriction to the air intake throttle when the engine is operating in an air restriction mode, when one of a change in position of the accelerator pedal over a period of time is greater than a pre-defined pedal acceleration limit or the position of the accelerator pedal is equal to a pre-defined pedal limit, and when the speed of the vehicle is less than a pre-defined speed limit. The method further includes closing an exhaust gas recirculation valve when the engine is operating in the air restriction mode, when one of the change in position of the accelerator pedal over the period of time is greater than the pre-defined acceleration rate or the position of the accelerator pedal is equal to the pre-defined pedal limit, and when the speed of the vehicle is less than the pre-defined speed limit. Removing the restriction to the air intake throttle and closing the exhaust gas recirculation valve allows unrestricted intake airflow to the engine.

Accordingly, when the engine is operating in the air restriction mode, wherein intake airflow to the engine is restricted to increase the temperature of the exhaust gas from the engine, the restrictions to the intake airflow are removed to permit better acceleration of the vehicle. The restrictions to the intake airflow are only removed when the vehicle is traveling less than the pre-defined speed limit, and when the vehicle is accelerating, for example, when the vehicle is accelerating heavily from a stop or from a slow vehicle speed.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is schematic flow chart of a method of controlling an engine of a vehicle operable in an air restriction mode.

DETAILED DESCRIPTION

Referring to the FIGURE, wherein like numerals indicate like parts throughout the several views, a method of controlling an internal combustion engine of a vehicle is shown at 20. The engine may include, but is not limited to, a diesel engine.

The vehicle may include a particulate filter. If the engine is a diesel engine, the particulate filter may be referred to as a diesel particulate filter. The particulate filter filters out particulate matter from the exhaust gas of the engine. The particulate matter collects in the particulate filter. Periodically, the particulate filter is regenerated. Regeneration of the particulate filter includes heating the particulate filter to a temperature sufficient to burn the particulate matter collected in the particulate filter, which converts the particulate matter to carbon dioxide that dissipates into the atmospher.

The vehicle may further include an oxidation catalyst. The oxidation catalyst oxidizes unburned hydrocarbons in the exhaust gas of the engine. In order to oxidize the unburned hydrocarbons, the oxidation catalyst is heated to a light-off temperature.

In order to heat the particulate filter for regeneration and/or heat the oxidation catalyst to the light-off temperature, the engine may be controlled in a manner to increase the temperature of the exhaust gas. When operating the engine in a manner to increase the temperature of the exhaust gas, the engine may be referred to as operating in an air restriction mode. Operating the engine in the air restriction mode may include, but is not limited to, restricting the flow of combustion air with an air intake throttle. Restricting the flow of combustion air reduces the air present in the combustion chambers of the engine during combustion, which increases the temperature of the exhaust gas. For example, when the engine is being operated in the air restriction mode to heat the exhaust for the purpose of regenerating the particulate filter, the engine may be referred to as operating in a regeneration mode. Accordingly, it should be appreciated that the air restriction mode includes, but is not limited to, the regeneration mode.

A computer, such as but not limited to an engine control unit, may control the operation of the engine. The engine control unit is in communication with various sensors throughout the vehicle for receiving information related to the operation of the vehicle and/or the engine, and sends signals to various components of the vehicle and/or the engine to control the operation of the vehicle and/or the engine. The engine control unit includes all software, memory, hardware and any other components necessary for processing the information and controlling the operation of the engine. Accordingly, the disclosed method described below may be embodied as an algorithm stored in the engine control unit, and operable to control the operation of the engine.

The method includes determining if the engine is operating in the air restriction mode with airflow to the air intake throttle of the engine restricted, block 22. The current mode of operation of the engine, and whether the engine is operating in the air restriction mode with restricted airflow to the air intake throttle, may be determined in any suitable manner, for example, by querying the engine control unit as to the current mode of operation of the engine. Alternatively, the engine control unit may analyze current information from various signals to determine if the engine is operating in the air restriction mode.

If the engine control unit determines that the engine is not operating in the air restriction mode or that the airflow to the air intake throttle is not restricted, indicated at 24, then the method may include maintaining the current operation of the engine, block 26. Accordingly, the operation of the engine is not adjusted and/or changed. In other words, the disclosed method may modify the operation of the engine when the engine is operating in the air restriction mode and the airflow to the air intake throttle is restricted.

If the engine is operating in the air restriction mode, indicated at 28, then the method further includes defining a pre-defined accelerator pedal limit and a pre-defined pedal acceleration rate, block 30. Defining the pre-defined accelerator pedal limit may include defining the pre-defined accelerator pedal limit equal to a maximum pedal position, i.e., equal to a fully depressed position. However, it should be appreciated that the pre-defined accelerator pedal limit may be defined to equal any specific pedal position within the range of movement of the accelerator pedal. The disclosed method may modify the operation of the engine if the position of the pedal exceeds the pre-defined pedal limit. The pre-defined pedal acceleration rate is the threshold above which the disclosed method may modify the operation of the engine. Accordingly, if the acceleration rate of the accelerator pedal is greater than the pre-defined pedal acceleration rate, then the disclosed method may modify the operation of the engine.

The method may further include continuously sensing a position of the accelerator pedal of the vehicle, block 32. The position of the accelerator pedal may be sensed, for example, by a position sensor attached to the accelerator and in communication with the engine control unit. The engine control unit receives the information related to the position of the accelerator pedal and stores the information in memory for further use.

The method may further include calculating a pedal acceleration rate of the accelerator pedal over a period of time, block 34. The pedal acceleration rate may be calculated from the sensed position of the accelerator pedal. The pedal acceleration rate of the accelerator pedal is the rate of change of the position of the accelerator pedal over time. Accordingly, the acceleration rate of the accelerator pedal measures how quickly or slowly the accelerator pedal is moving, for example, how quickly the accelerator pedal is depressed in order to accelerate the vehicle. The pedal acceleration rate may be calculated by, for example, by the engine control unit.

The method further includes determining if the change in position of the accelerator pedal over the period of time, i.e., the pedal acceleration rate, is greater than the pre-defined pedal acceleration rate, and if the position of the accelerator is equal to or greater than pre-defined pedal limit, block 36. If the engine is operating in the air restriction mode, the change in position of the accelerator pedal over the period of time, i.e., the pedal acceleration rate, is equal to or less than the pre-defined acceleration rate, and the position of the accelerator pedal is less than the pre-defined pedal limit, indicated at 38, then the method may further include maintaining the current operation of the engine, block 26. Accordingly, if the engine is operating in the air restriction mode, and the pedal accelerator is not at or beyond the pre-defined accelerator pedal limit, e.g., the pedal is not fully depressed, and the pedal acceleration rate is less than the pre-defined acceleration rate, e.g., the position of the accelerator pedal is constant, then the engine control unit does not change the current operation of the engine.

If the engine is operating in the air restriction mode, the change in position of the accelerator pedal over the period of time, i.e., the pedal acceleration rate, is greater than the pre-defined acceleration rate, and the position of the accelerator pedal is greater than the pre-defined pedal limit, indicated at 40, then the method may further include defining a pre-defined speed limit, block 42. The pre-defined speed limit may be defined as, but is not limited to, being equal to five miles per hour (5 mph). However, it should be appreciated that the pre-defined speed limit may be defined to some other speed of the vehicle.

The method further includes sensing a speed of the vehicle, block 44. The speed of the vehicle may be sensed by, for example, a speed sensor coupled to one or more wheels of the vehicle, and in communication with the engine control unit to provide information related to the speed of the vehicle to the engine control unit. However, it should be appreciated that the speed of the vehicle may be sensed and/or calculated in some other manner. The engine control unit receives the information related to the speed of the vehicle and stores the information in memory for further use. Sensing a speed of the vehicle may include, but is not limited to, continuously sensing a speed of the vehicle.

The method further includes determining if the speed of the vehicle is equal to or greater than the pre-defined speed limit, block 46. If the speed of the vehicle is equal to or greater than the pre-defined speed limit, indicated at 48, then the method may further include maintaining the current operation of the engine, block 26. Accordingly, the engine control unit does not change the operation of the engine when the vehicle is traveling at or above the pre-defined speed limit.

If the speed of the vehicle is less than the pre-defined speed limit, indicated at 50, then the method may further include calculating an acceleration rate of the vehicle over a period of time, block 52. The acceleration rate of the vehicle is the change in speed of the vehicle over a given time period. The engine control unit may calculate the acceleration rate of the vehicle from the continuously sensed speed of the vehicle.

The method further includes determining if the vehicle is accelerating, block 54. If the vehicle is not accelerating or is decelerating, indicated at 56, then the method may further include maintaining the current operation of the engine, block 26. Accordingly, the engine control unit does not change the operation of the engine if the engine is not accelerating. In other words, the engine control unit only changes the operation of the engine when the vehicle is accelerating.

If the vehicle is accelerating, indicated at 58, and the engine is operating in the air restriction mode, then the method may further include removing the restriction to the air intake throttle, block 60. The restriction to the air intake throttle is removed when specific conditions are satisfied. The specific conditions that must be satisfied in order to remove the restriction to the air intake throttle occur when one of the change in position of the accelerator pedal over a period of time, i.e., the pedal acceleration rate, is greater than the pre-defined pedal acceleration limit or the position of the accelerator pedal is equal to the pre-defined pedal limit, and when the speed of the vehicle is less than the pre-defined speed limit. Additionally, if the vehicle is accelerating, indicated at 58, and the engine is operating in the air restriction mode, then the method may further include closing an exhaust gas recirculation valve, block 62. The exhaust gas recirculation valve is closed when specific conditions are satisfied. The specific conditions that must be satisfied in order to close the exhaust gas recirculation valve occur when one of the change in position of the accelerator pedal over a period of time, i.e., the pedal acceleration rate, is greater than the pre-defined pedal acceleration limit or the position of the accelerator pedal is equal to the pre-defined pedal limit, and when the speed of the vehicle is less than the pre-defined speed limit. Removing the restriction to the air intake throttle and closing the exhaust gas recirculation valve allows unrestricted intake airflow to the engine, which improves acceleration of the vehicle. Accordingly, the disclosed method improves acceleration of the vehicle when the engine is operating in the air restriction mode.

While the best modes for carrying out the invention have been described in detail, those familiar with the art to which this invention relates will recognize various alternative designs and embodiments for practicing the invention within the scope of the appended claims.

The invention claimed is:

1. A method of controlling an internal combustion engine of a vehicle, the method comprising:
    continuously sensing a position of an accelerator pedal of the vehicle;
    sensing a speed of the vehicle;
    removing a restriction to the air intake throttle to allow unrestricted intake airflow to the engine when the engine is operating in an air restriction mode, when one of a change in position of the accelerator pedal over a period of time is greater than a pre-defined pedal acceleration limit or the position of the accelerator pedal is equal to a pre-defined pedal limit, and when the speed of the vehicle is less than a pre-defined speed limit.

2. A method as set forth in claim 1 further comprising closing an exhaust gas recirculation valve to allow unrestricted intake airflow to the engine when the engine is operating in the air restriction mode, when one of a change in position of the accelerator pedal over a period of time is greater than a pre-defined acceleration rate or the position of the accelerator pedal is equal to a pre-defined pedal limit, and when the speed of the vehicle is less than a pre-defined speed limit.

3. A method as set forth in claim 2 further comprising determining if the engine is operating in an air restriction mode with an air intake throttle of the engine restricted to increase a temperature of a flow of exhaust gas from the engine.

4. A method as set forth in claim 3 further comprising calculating a pedal acceleration rate of the accelerator pedal over a period of time from the sensed position of the accelerator pedal.

5. A method as set forth in claim 4 further comprising defining a pre-defined pedal limit.

6. A method as set forth in claim 5 wherein defining a pre-defined pedal limit is further defined as defining a pre-defined pedal limit equal to a maximum pedal position.

7. A method as set forth in claim 5 further comprising defining a pre-defined speed limit.

8. A method as set forth in claim 7 wherein defining a pre-defined speed limit is further defined as defining a pre-defined speed limit equal to five miles per hour (5 mph).

9. A method as set forth in claim 7 wherein sensing a speed of the vehicle is further defined as continuously sensing a speed of the vehicle.

10. A method as set forth in claim 9 further comprising calculating an acceleration rate of the vehicle over a period of time from the continuously sensed speed of the vehicle.

11. A method as set forth in claim 10 further comprising maintaining a current operation of the engine when the engine is not operating in the air restriction mode.

12. A method as set forth in claim 11 further comprising maintaining the current operation of the engine when the engine is operating in the air restriction mode, the change in position of the accelerator pedal over the period of time is equal to or less than the pre-defined acceleration rate, and the position of the accelerator pedal is less than the pre-defined pedal limit.

13. A method as set forth in claim 12 further comprising maintaining the current operation of the engine when the speed of the vehicle is equal to or greater than the pre-defined speed limit.

14. A method as set forth in claim 13 further comprising maintaining the current operation of the engine when the vehicle is not accelerating.

15. A method of controlling an internal combustion engine of a vehicle, the method comprising:
    continuously sensing a position of an accelerator pedal of the vehicle;
    sensing a speed of the vehicle;
    removing a restriction to the air intake throttle to allow unrestricted intake airflow to the engine when the engine is operating in an air restriction mode, when one of a change in position of the accelerator pedal over a period of time is greater than a pre-defined pedal acceleration limit or the position of the accelerator pedal is equal to a pre-defined pedal limit, and when the speed of the vehicle is less than a pre-defined speed limit; and
    closing an exhaust gas recirculation valve to allow unrestricted intake airflow to the engine when the engine is operating in the air restriction mode, when one of the change in position of the accelerator pedal over the period of time is greater than the pre-defined acceleration rate or the position of the accelerator pedal is equal to the pre-defined pedal limit, and when the speed of the vehicle is less than the pre-defined speed limit.

16. A method as set forth in claim 15 further comprising determining if the engine is operating in an air restriction mode with an air intake throttle of the engine restricted to increase a temperature of a flow of exhaust gas from the engine.

17. A method as set forth in claim 16 further comprising maintaining a current operation of the engine when the engine is not operating in the air restriction mode.

18. A method as set forth in claim 17 further comprising maintaining the current operation of the engine when the engine is operating in the air restriction mode, the change in position of the accelerator pedal over the period of time is equal to or less than the pre-defined acceleration rate, and the position of the accelerator pedal is less than the pre-defined pedal limit.

19. A method as set forth in claim 18 further comprising maintaining the current operation of the engine when the speed of the vehicle is equal to or greater than the pre-defined speed limit.

20. A method as set forth in claim 19 further comprising maintaining the current operation of the engine when the vehicle is not accelerating.

\* \* \* \* \*